US012537351B2

(12) United States Patent
Liu et al.

(10) Patent No.: US 12,537,351 B2
(45) Date of Patent: Jan. 27, 2026

(54) MULTIMEDIA SOCKET CONNECTOR WITH FRACTURE OPENING AND MANUFACTURING METHOD THEREOF

(71) Applicant: JESS-LINK PRODUCTS CO., LTD., New Taipei (TW)

(72) Inventors: Hu Liu, New Taipei (TW); Hsu-Feng Chang, New Taipei (TW); Ching-Hung Liu, New Taipei (TW)

(73) Assignee: Jess-link Products Co., Ltd., New Taipei (TW)

( * ) Notice: Subject to any disclaimer, the term of this patent is extended or adjusted under 35 U.S.C. 154(b) by 357 days.

(21) Appl. No.: 18/306,679

(22) Filed: Apr. 25, 2023

(65) Prior Publication Data

US 2023/0361517 A1 Nov. 9, 2023

(30) Foreign Application Priority Data

May 6, 2022 (TW) ................................. 111117143

(51) Int. Cl.
*H01R 24/60* (2011.01)
*H01R 13/405* (2006.01)
*H01R 43/24* (2006.01)

(52) U.S. Cl.
CPC ........... *H01R 24/60* (2013.01); *H01R 13/405* (2013.01); *H01R 43/24* (2013.01)

(58) Field of Classification Search
None
See application file for complete search history.

(56) References Cited

U.S. PATENT DOCUMENTS 7,445,469 B2 * 11/2008 Wu ........................ H01R 13/41 439/79
7,621,788 B1 * 11/2009 Feng ...................... H01R 43/16 439/885

(Continued)

FOREIGN PATENT DOCUMENTS

CN 102097688 A 6/2011
CN 102842828 A 12/2012

(Continued)

OTHER PUBLICATIONS

Official Action Issued by Foreign Patent Office in Corresponding Application No. 111117143.

*Primary Examiner* — Oscar C Jimenez
(74) *Attorney, Agent, or Firm* — Rosenberg, Klein & Lee

(57) ABSTRACT

A multimedia socket connector includes an insulating component and a terminal set. The insulating component includes an insulating main body and a tongue portion. The tongue portion includes a plurality of first grooves and second grooves. The first grooves are configured on a first plane of the tongue portion, and the second grooves are configured on a second plane corresponding to the first plane of the tongue portion. The terminal set includes a plurality of terminals. Each of the terminals includes a main portion and a contact portion. The terminal set includes a plurality of first terminals and second terminals. The contact portions of the first terminals are configured in the first grooves respectively, the contact portions of the second terminals are configured in the second grooves respectively, and the main portions of the first terminals and the second terminals are horizontally arranged on the same plane.

11 Claims, 7 Drawing Sheets

(56) References Cited

U.S. PATENT DOCUMENTS

| | | | | |
|---|---|---|---|---|
| 9,960,543 | B2 * | 5/2018 | Chen | H01R 13/6585 |
| 10,826,246 | B2 * | 11/2020 | Zhang | H01R 13/6471 |
| 2017/0294753 | A1 * | 10/2017 | Wu | H01R 43/24 |

FOREIGN PATENT DOCUMENTS

| | | | |
|---|---|---|---|
| CN | 206610936 | U | 11/2017 |
| CN | 208580906 | U | 3/2019 |
| CN | 111224269 | A | 6/2020 |
| CN | 210723411 | U | 6/2020 |
| TW | M632646 | U | 10/2022 |

* cited by examiner

MULTIMEDIA SOCKET CONNECTOR WITH FRACTURE OPENING AND MANUFACTURING METHOD THEREOF

BACKGROUND OF THE INVENTION

1. Field of the Invention

The present invention relates to a connector, and more particularly, to a high-speed multimedia socket connector and its manufacturing method.

2. Description of the Prior Art

Connectors are connecting components and accessories for electrical signals, and the electronic devices translate and transmit the signal to each other through cables and connectors. That is to say, the connectors are the communicating bridges for the signals. The connectors are widely applied to cars and computer peripheral and communicating data applications, industries, military and aerospace industry, transportation, consumer electronics, medical treatments, instruments, commercial equipment and so on. Therefore, the connectors play an important role in many fields.

With the development of electronic industry, the demand of signal transmission efficiency is getting higher and higher. Therefore, high-frequency multimedia connectors have become one of the most common types of connectors nowadays. In order to meet the requirements of high frequency transmission, most of the multimedia socket connectors are designed with two rows of terminals on top and bottom. In general, the terminals are formed through two plates that are processed through the upper terminal mold and the lower terminal mold respectively. Furthermore, when the socket connector is performed in insert-molding process, the top and bottom rows of terminal blocks need to be placed in a stack. Moreover, when the socket connector is performed in insert-molding process and the strip is fractured, the insulating component is easily to generate burrs, which not only increases the material cost and reduces the production efficiency, but also affects the high frequency transmission characteristics of the socket connector. Besides, there is a trend of miniaturization of electronic products, the distance between the components inside the multimedia connector is getting closer and closer, which will cause crosstalk between the inside and outside of the connector and affect the high-frequency transmission characteristics of the connector.

Therefore, it is necessary to provide a new connector to solve the problems of the prior art.

SUMMARY OF THE INVENTION

Therefore, one category of the present invention provides a multimedia socket connector to solve the problems with the prior art. In one embodiment, the multimedia socket connector includes an insulating component and a terminal set. The insulating component includes an insulating main body and a tongue portion extending from the insulating main body. The tongue portion includes a plurality of first grooves and a plurality of second grooves. The first grooves are disposed on a first plane of the tongue portion, and the second grooves are disposed on a second plane corresponding to the first plane of the tongue portion. The terminal set includes a plurality of terminals. Each of the terminals has a main portion and a contact portion extending from the main portion. The terminals include a plurality of first terminals and a plurality of second terminals. The contact portions of the first terminals are disposed in the first grooves respectively, the contact portions of the second terminals are disposed in the second grooves respectively, and the main portions of the first terminals and the second terminals are arranged in the same plane.

Wherein, the terminal set is formed in one piece, and the terminal set is formed by stamping and bending a single metal sheet.

Wherein, the tongue portion of the insulating component includes a plurality of fracture openings, and the terminals include a fracture portion. The fracture openings are disposed on a third plane between the first plane and the second plane and corresponding to the insulating main body, the fracture openings are communicated with the first grooves and the second grooves. The fracture portion is located at the end of the contact portion and corresponding to the main portion. The fracture portions of the first terminals and the second terminals are disposed in the fracture openings respectively.

Wherein, the tongue portion includes a plurality of protruding structures disposed at the fracture openings respectively, and the fracture portion of the terminals has a fracture structure. The shape of the protruding structure is corresponding to the shape of the fracture structure.

Wherein, the fracture openings are horizontally arranged on the same plane.

Furthermore, the tongue portion includes a recessed structure disposed on the third plane, and the fracture portions of the first terminals and the second terminals are aligned with the recessed structure.

Wherein, the widths of outer terminals located on the outermost two sides of the terminal set are greater than the widths of the other terminals.

Wherein, the multimedia socket connector further includes a metal case sleeved on the outer side of the insulating component. The metal case includes a case body and a protruding sheet extending from the case body. The protruding sheet includes a hole, and the protruding sheet is attached to the outer side of the case body in a bent manner.

Furthermore, the case body includes an elastic structure, and the position of the elastic structure is corresponding to the position of the hole. When a plug matching up with the multimedia socket connector inserts into the metal case, the elastic structure is squeezed by the plug to move into the hole.

Wherein, the contact portions of the first terminal and the second terminal are arranged in stagger manner.

Wherein, the lengths of the terminals of the terminal set are the same.

Another one category of the present invention provides a manufacturing method of multimedia socket connector including the following steps of: stamping a metal sheet to form a plurality of terminals, wherein the terminals include a plurality of first terminals and a plurality of second terminals, and the ends of the terminals are connected to a strip; bending the contact portions of the first terminals to a first plane, and bending the contact portions of the second terminals to a second plane; forming an insulating component around the terminals by insert-molding process; and fracturing the strip to form a multimedia socket connector.

In summary, the multimedia socket connector of the present invention can be formed by the one-piece tear structure terminal. Therefore, the contact portions are staggered at the top and bottom and the main portions are horizontally arranged in the same plane with the same length, thereby reducing the cost and volume and improving the stability of signal transmission. Moreover, the multimedia socket connector of the present invention can effectively suppress interference from external components and prevent the signal fading and crosstalk of the signal terminals in the terminal set by setting the first ground terminal and the second ground terminal on the outermost side and wider than the other terminals, thereby improving the shielding efficiency. Furthermore, the recessed structure of the multimedia socket connector of the present invention can avoid the generation of burrs on the insulating component during fracturing the terminal set, thus enhancing the convenience, practicality and transmission characteristics of the socket connector. In addition, the multimedia socket connector of the present invention can increase the strength of the metal case through the protruding sheets of the metal case and make the case body completely cover the terminal set, thus enhancing the shielding efficiency. Moreover, the multimedia socket connector of the present invention can avoid structural interference and maintain contact between the plug and the socket by the elastic structures and the holes of the protruding sheets, thereby enhancing stability.

BRIEF DESCRIPTION OF THE APPENDED DRAWINGS

DETAILED DESCRIPTION OF THE INVENTION

Figure 1:
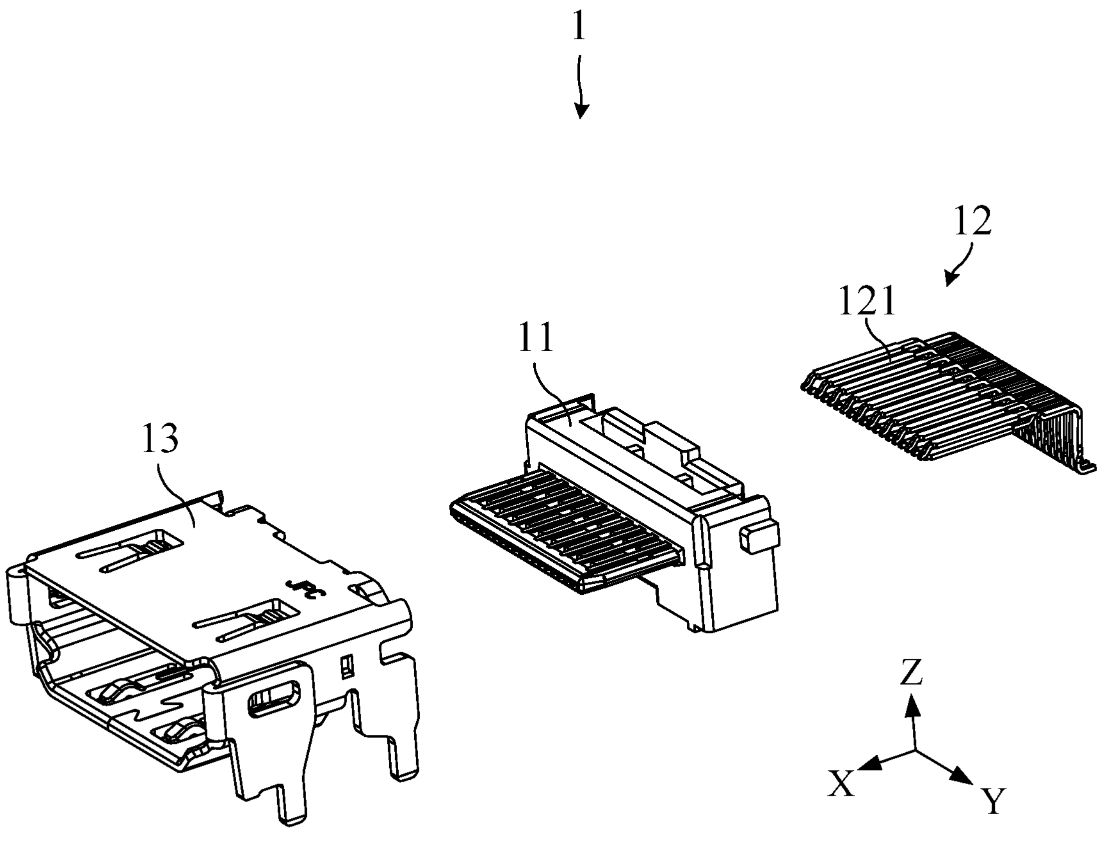
FIG. 1 is an exploded diagram illustrating a multimedia socket connector according to an embodiment of the present invention.

For the sake of the advantages, spirits and features of the present invention can be understood more easily and clearly, the detailed descriptions and discussions will be made later by way of the embodiments and with reference of the diagrams. It is worth noting that these embodiments are merely representative embodiments of the present invention, wherein the specific methods, devices, conditions, materials and the like are not limited to the embodiments of the present invention or corresponding embodiments. Moreover, the devices in the figures are only used to express their corresponding positions and are not drawing according to their actual proportion.

In the description of this specification, the description with reference to the terms "a specific embodiment", "another specific embodiment" or "parts of specific embodiments" etc. means that the specific feature, structure, material or feature described in conjunction with the embodiment include in at least one embodiment of the present invention. In this specification, the schematic representations of the above-mentioned terms do not necessarily refer to the same embodiment. Moreover, the described specific features, structures, materials or characteristics can be combined in any one or more embodiments in a suitable manner.

In the description of the present invention, it is to be understood that the orientations or positional relationships of the terms "longitudinal, lateral, upper, lower, front, rear, left, right, top, bottom, inner, outer" and the like are based on the orientation or positional relationship shown in the drawings. It is merely for the convenience of the description of the present invention and the description of the present invention, and is not intended to indicate or imply that the device or component referred to has a specific orientation, is constructed and operated in a specific orientation, and therefore cannot be understood as limitations of the invention.

Please refer from FIG. 1. FIG. 1 is an exploded diagram illustrating a multimedia socket connector 1 according to an embodiment of the present invention. As shown in FIG. 1, in this embodiment, the multimedia socket connector 1 includes an insulating component 11, a terminal set 12 and a metal case 13. The terminal set 12 is disposed in the insulating component 11, and the metal case 13 is sleeved on the outer side of the insulating component 11. In practice, the metal case 13 can be an enclosed rectangular structure formed by bending a metal plate and has a through hole. The length of the metal case 13 can be greater than the length of the insulating component 11, and the insulating component 11 can be disposed in the through hole and close to one opening of the metal case 13. At this time, the other opening of the metal case 13 can be formed a containing space for a plug matching to the multimedia socket connector 1 to insert, so that the multimedia socket connector 1 and the plug can be connected to each other.

Figure 2A:
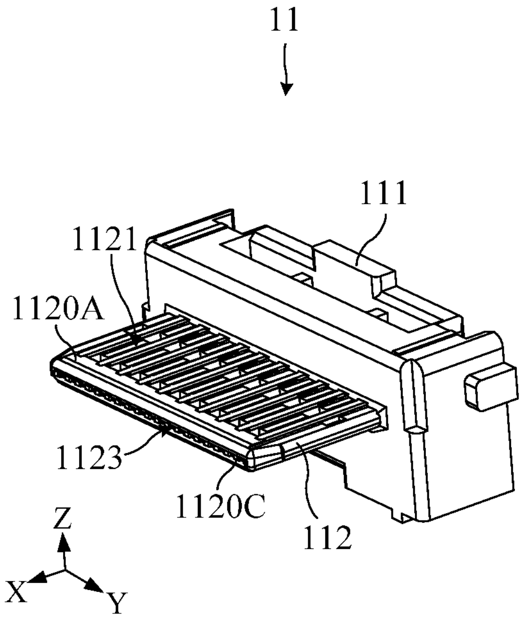
FIG. 2A to FIG. 2C are structural schematic diagrams illustrating the insulating component in different perspective views of FIG. 1.
Figure 2B:
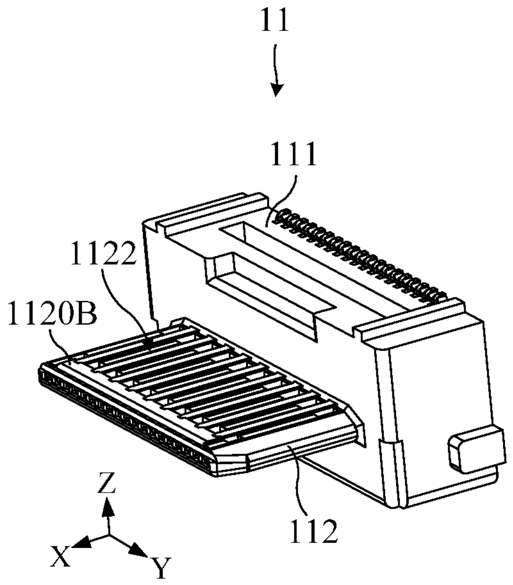
Figure 2C:
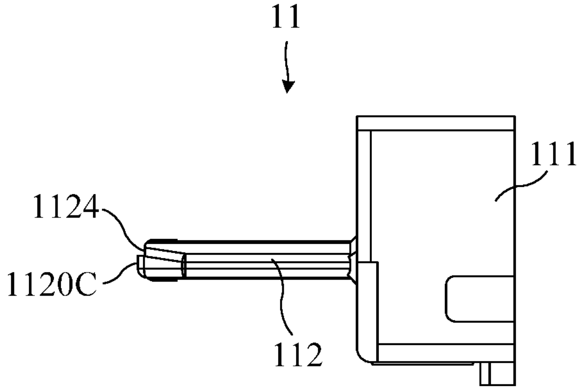

Please refer to FIG. 1, FIG. 2A to FIG. 2C. FIG. 2A to FIG. 2C are structural schematic diagrams illustrating the insulating component 11 in different perspective views of FIG. 1. FIG. 2A and FIG. 2B are the isometric views of the insulating component 11, and FIG. 2C is a side view of the insulating component 11. As shown in FIG. 2A and FIG. 2B, in this embodiment, the insulating component 11 includes an insulating main body 111 and a tongue portion 112. The tongue portion 112 protrudes from the insulating main body 111 and includes a first plane 1120A, a second plane 1120B and a third plane 1120C. The first plane 1120A is relative to the second plane 1120B. The third plane 1120C is located between the first plane 1120A and the second plane 1120B and relative to the insulating component 11. In practice, the tongue portion 112 of the insulating component 11 is approximately rectangular shape. The first plane 1120A is located on the top of the tongue portion 112, and the second plane 1120B is located bottom of the tongue portion 112. The third plane 1120C is vertically adjacent to the first plane 1120A and the second plane 1120B and faces towards the opening of the metal case 13.

Furthermore, the first plane 1120A of the tongue portion 112 includes a plurality of first grooves 1121, the second plane 1120B of the tongue portion 112 includes a plurality of second grooves 1122, and the third plane 1120C of the tongue portion 112 includes a plurality of fracture openings 1123. In this embodiment, the fracture openings 1123 are horizontally arranged on the same plane, and the fracture openings 1123 are communicated with the first grooves 1121 and the second grooves 1122. In practice, the fracture openings 1123 can be horizontally arranged in Y-axis direction, and the fracture openings 1123 staggered to connect the first grooves 1121 and the second grooves 1122. For example, the fracture openings 1123 located at the odd number are communicated with the first grooves 1121, and the fracture openings 1123 located at the even number are communicated with the second grooves 1122, it is not limited in practice. The orders and the arrangements among the fracture openings, the first grooves and the second grooves can be determined as design or requirement.

Figure 3A:
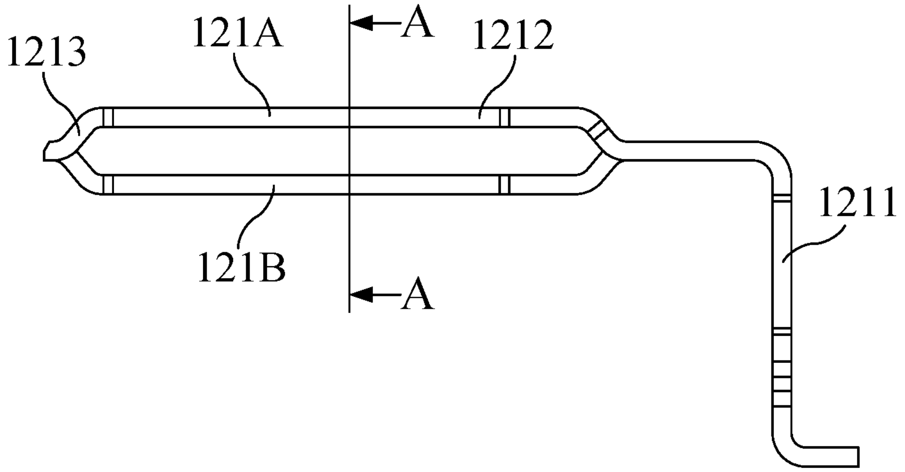
FIG. 3A and FIG. 3B are structural schematic diagrams illustrating the terminal set in different perspective views of FIG. 1.
Figure 3B:
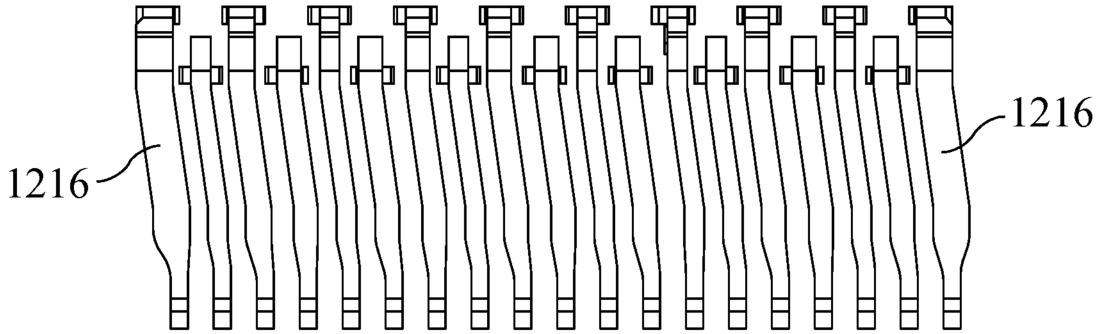
Figure 3C:
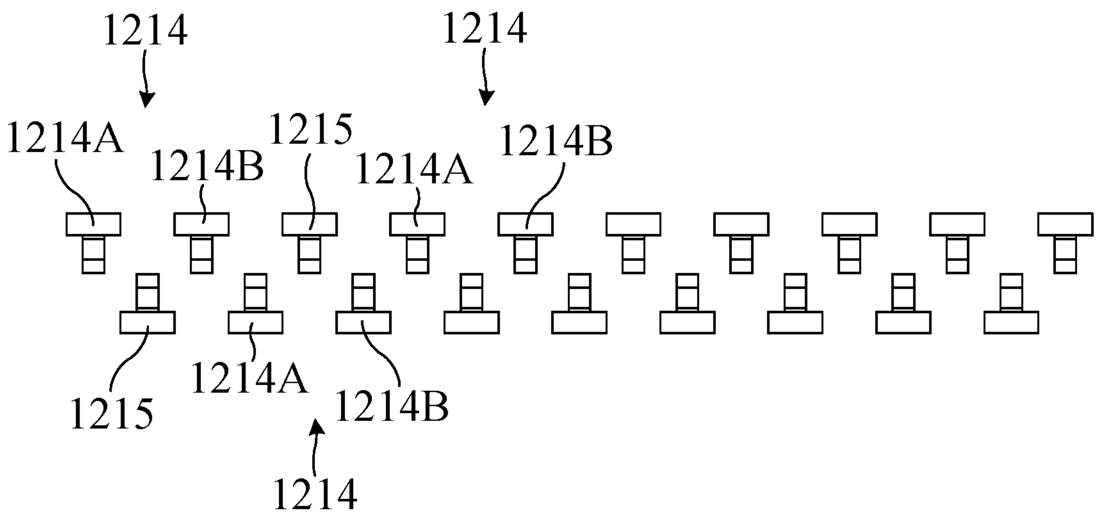
FIG. 3C is a sectional diagram illustrating along line A-A of FIG. 3A.

Please refer to FIG. 1, FIG. 3A, FIG. 3B and FIG. 3C. FIG. 3A and FIG. 3B are structural schematic diagrams illustrating the terminal set 12 in different perspective views of FIG. 1. FIG. 3C is a sectional diagram illustrating along line A-A of FIG. 3A. FIG. 3A is a back view of the terminal set 12, FIG. 2 is a side view of the terminal set 12, and FIG. 3C is a sectional diagram illustrating the contact portions 1212 of the terminal set 12. As shown from FIG. 3A to FIG. 3C, in this embodiment, the terminal set 12 includes a plurality of terminal 121, and each of terminal 121 has a main portion 1211, a contact portion 1212 and a fracture portion 1213. The contact portion 1212 is extended from the main portion 1211. The fracture portion 1213 is disposed on the end of the contact portion 1212 and relative to the main portion 1211. That is to say, the main portion 1211 and the fracture portion 1213 and located at two ends of the contact portion 1212.

In this embodiment, the terminals 121 of the terminal set 12 include a plurality of first terminals 121A and a plurality of second terminals 121B. The contact portions 1212 of the first terminals 121A are disposed in the first grooves 1121 of the tongue portion 112 respectively, and the contact portions 1212 of the second terminals 121B are disposed in the second grooves 1122 of the tongue portion 112 respectively. Moreover, the contact portions 1212 of the first terminals 121A and the second terminals 121B can be corresponding to the first grooves 1121 and the second grooves 1122 by stamping or bending. When the multimedia socket connector 1 is assembled, the contact portions 1212 of the first terminals 121A and the second terminals 121B can be configured in the first grooves 1121 and the second grooves 1122 and exposed outside of the insulating main body 111, so that the terminals of the plug can contact the first terminals 121A and the second terminals 121B to achieve signal transmitting function.

Furthermore, in this embodiment, the contact portions 1212 of the first terminals 121A and the second terminals 121B not only can be arranged in two rows, the contact portions 1212 of the first terminals 121A and the second terminals 121B also can be staggered. In practice, as shown in FIG. 3C, each of the first terminals 121A and the second terminals 121B are staggered in the Y-axis direction and does not overlap with each other. Moreover, in this embodiment, the main portions 1211 of the first terminals 121A and the second terminals 121B are horizontally arranged on the same plane. The fracture portions 1213 of the first terminals 121A and the second terminals 121B are horizontally arranged on the same plane and disposed in the fracture openings 1123 respectively. In practice, the main portions 1211 of the first terminals 121A and the second terminals 121B can be configured in the insulating main body 111, and the shape of the main portion 1211 can also be formed in bent or stamp manner according to the shape of the insulating main body 111.

In this embodiment, the terminals 121 of the terminal set 12 include a plurality pair of signal terminals 1214 and a plurality of ground terminals 1215. Each pair of signal terminals 1214 includes a first signal terminal 1214A and a second signal terminal 1214B. The ground terminals 1215 are located between two pairs of the signal terminals 1214 and located between the first signal terminal 1214A and the second signal terminal 1214B of each pair of signal terminals 1214 simultaneously. In practice, each pair of the signal terminals 1214 can be high frequency and high-speed signal differential terminals. As shown in FIG. 3C, the ground terminal 1215 is located between two pairs of the signal terminals 1214 in the first plane, and the ground terminal 1215 of the second plane is located between the first signal terminal 1214A and the second signal terminal 1214B of the first plane, to reduce the interference between two pairs of the signal terminals and the internal interference of the differential terminal in each pair of the signal terminals.

Moreover, in this embodiment, the widths of outer terminals 1216 located on the outermost two sides of the terminal set 12 are greater than the widths of the other terminals 121. In practice, the outer terminals 1216 are disposed on the left side and the right side of the terminals respectively. As shown in FIG. 3A, when the total number of the terminals 121 of the terminal set 12 is odd, the outer terminal 1216 is the signal terminal. At this time, the terminal next to the outer terminal 1216 is also the signal terminal. Therefore, when the widths of outer terminals 1216 are greater than the widths of the other terminals 121, the outer terminals 1216 can be shielded by the metal case 13, thereby reducing noise signal and internal/external interference. Therefore, the multimedia socket connector of the present invention provides the widen outer terminals to efficiently suppress internal and external interference and prevent signal degradation and crosstalk of the signal terminals in the terminal set.

Figure 4:
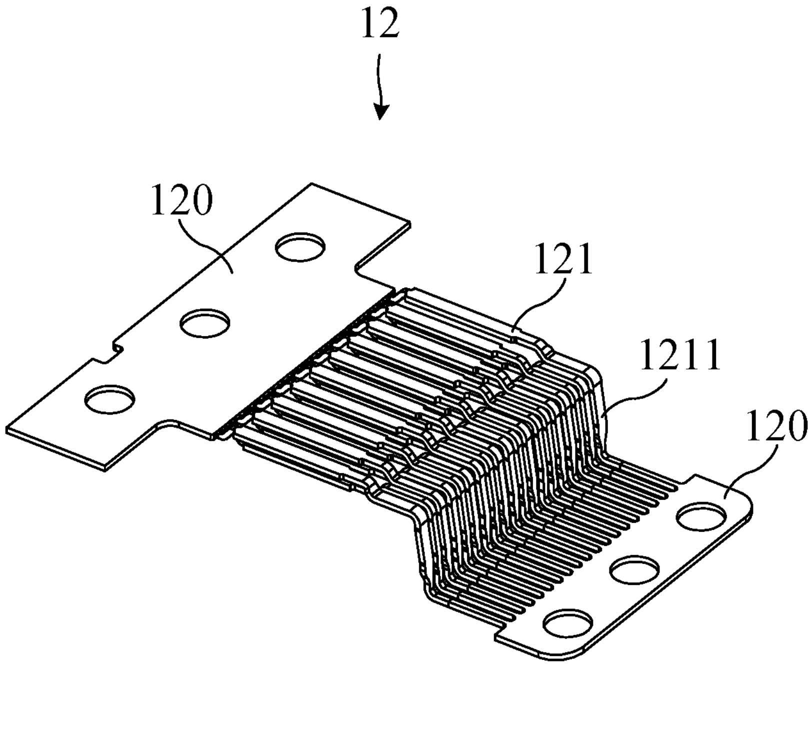
FIG. 4 is a structural schematic diagram illustrating the unassembled terminal set according to an embodiment of the present invention.

Please refer to FIG. 4. FIG. 4 is a structural schematic diagram illustrating the unassembled terminal set 12 according to an embodiment of the present invention. As shown in FIG. 4, in this embodiment, the terminal set 12 is formed in one piece and formed by stamping and bending a single metal sheet. In practice, the stamping device stamps the metal sheet to form the plurality of terminals 121. At this time, two ends of the terminals 121 are connected to the unstamped strip 120 respectively. Then, the bending device bends the contact portions 1212 of the terminals 121 to make the terminals 121 staggered up and down and staggered from side to side. At this time, the main portions 1211 and the fracture portions 1213 of the terminals 121 are still arranged in the same plane. Then, the bending device bends the main portions 1211 of the terminals 121 according to the design or requirement to form the terminal set 12. Therefore, the terminal set of the multimedia socket connector of the present invention is a one-piece tear structure terminal, which can form staggered upper and lower terminals by only one metal sheet instead of stacking two sheets, and the body portions of the terminal set are arranged horizontally in the same plane, thereby reducing cost and volume. Moreover, the terminal set 12 of the multimedia socket connector 1 is formed by processing the single metal sheet, so all the terminals 121 of the terminal set 12 have the same length, that is, the transmission characteristics of each terminal 121 are the same, thereby improving the stability of signal transmission.

Figure 5:
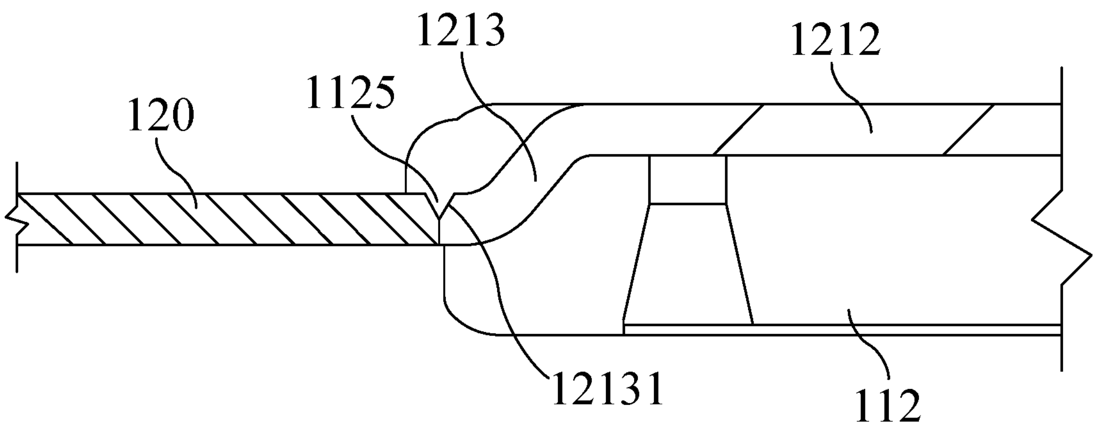
FIG. 5 is a sectional diagram illustrating the assembled tongue portion of the insulating component and the terminal set of the multimedia socket connector in FIG. 1.

Please refer from FIG. 2 to FIG. 5. FIG. 5 is a sectional diagram illustrating the assembled tongue portion 112 of the insulating component 11 and the terminal set 12 of the multimedia socket connector 1 in FIG. 1. FIG. 5 shows a partial enlarged section of the tongue portion 112 and the terminal set 12. As shown in FIG. 2 to FIG. 5, in this embodiment, the tongue portion 112 of the insulating main body 111 further includes a plurality of protruding structures 1125 disposed at the fracture openings 1123 respectively, and the fracture portions 1213 of the terminals of the terminal set 12 have fracture structure 12131. The shape of the protruding structure 1125 is corresponding to the shape of the fracture structure 12131. In practice, the fracture structures 12131 can be generated in stamp manner between the strip 120 of the terminal set 12 and the fracture portions 1213 and between the strip 120 and the welding portion connected on the other end of the main portions 1211. The fracture structure 12131 can be attached to the protruding structure 1125 of the tongue portion 112, so that the fracture openings 1123 of the tongue portion 112 of the insulating main body 111 will not generate gaps. In this embodiment, as shown in FIG. 5, the shapes of the protruding structure 1125 and the fracture structure 12131 are triangle, but it is not limited in practice, the shapes of the protruding structure and the fracture structure can also be semi-circular or other matching shapes.

Moreover, the tongue portion 112 of the insulating component 11 includes a recessed structure 1124 disposed on the third plane 1120C, and the fracture portions 1213 of the first terminals 121A and the second terminals 121B of the terminal set 12 are aligned with the recessed structure 1124. In practice, the recessed structure 1124 can be located at the corner of the third plane 1120C and the second plane 1120B, but it is not limited thereto. The recessed structure 1124 can also be located at the corner of the third plane 1120C and the first plane 1120A. The shape of the recessed structure 1124 can be L shape to generate a notch at the corner of the first plane 1120A and the third plane 1120C. Furthermore, part of the fracture openings 1123 located on the tongue portion 112 can be communicated with the notch formed by the recessed structure 1124. In addition, the aforementioned protruding structure 1125 can also be located at the intersection of the recessed structure 1124 and the fracture opening 1123.

In practice, the insulating component 11 of the multimedia socket connector 1 of the present invention can be formed in insert-molding manner. In the process of producing the insulating component 11, the terminal set 12 including the strip 120 (as shown in FIG. 4) is placed into the mold of the insulating component, and then the mold is performed the insert-molding process to form the insulating component 11. Therefore, when the multimedia socket connector 1 is performed the insert-molding process, the insulating component 11 covers the main portions 1211, the contact portions 1212 and fracture portions 1213 of the terminal set 12, one side of the strip of the terminal set 12 is not covered by the insulating component due to the blockage of the mold of the insulating component to form the recessed structure 1124, and the protruding structures 1125 of the insulating component 11 are also formed at the tongue portion 112 due to the fracture structures 12131 of the terminal set 12.

Since the fracture portions 1213 of the first terminals 121A and the second terminals 121B of the terminal set 12 are aligned with the recessed structure 1124, the strip 120 and the fracture structures 12131 of the terminal set 12 are exposed on the outer side of the insulating component 11. Furthermore, the fracture structures 12131 of the terminal set 12 are tightly attached to the protruding structures 1125 of the tongue portion 112. Therefore, when the multimedia socket connector 1 is performed the insert-molding process to generate the insulating component 11 and the strip of the terminal set 12 is fractured, the strip of the terminal set 12 can be bent toward in the direction of the notch of the recessed structure 1124 without touching the insulating component 11, to avoid the generation of the burr of the insulating component 11 and the debris generated by the burr of the insulating component 11 from affecting the terminal or other components, which further enhances the convenience, practicality and transmission characteristics of the socket connector.

Figure 6A:
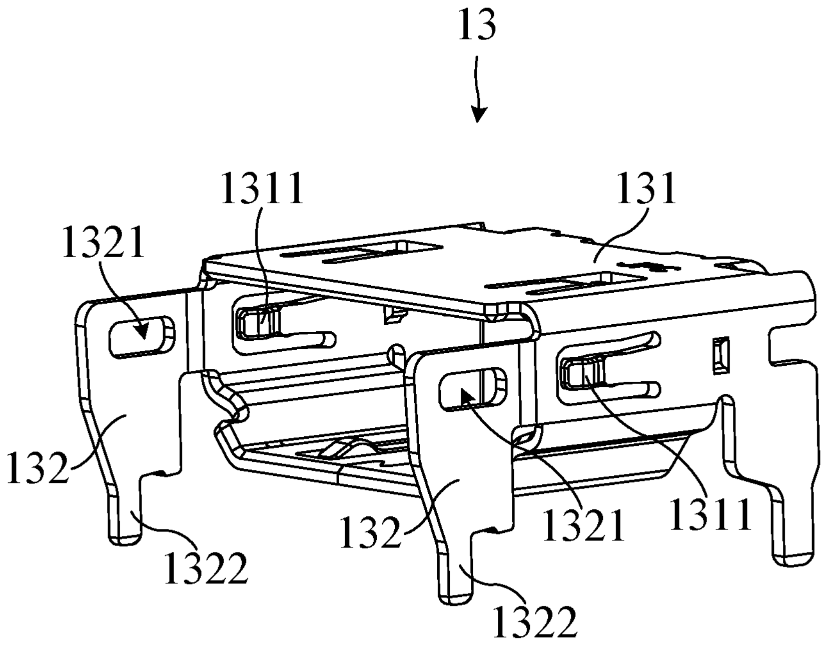
FIG. 6A is a structural schematic diagram illustrating the unassembled metal case of FIG. 1.
Figure 6B:
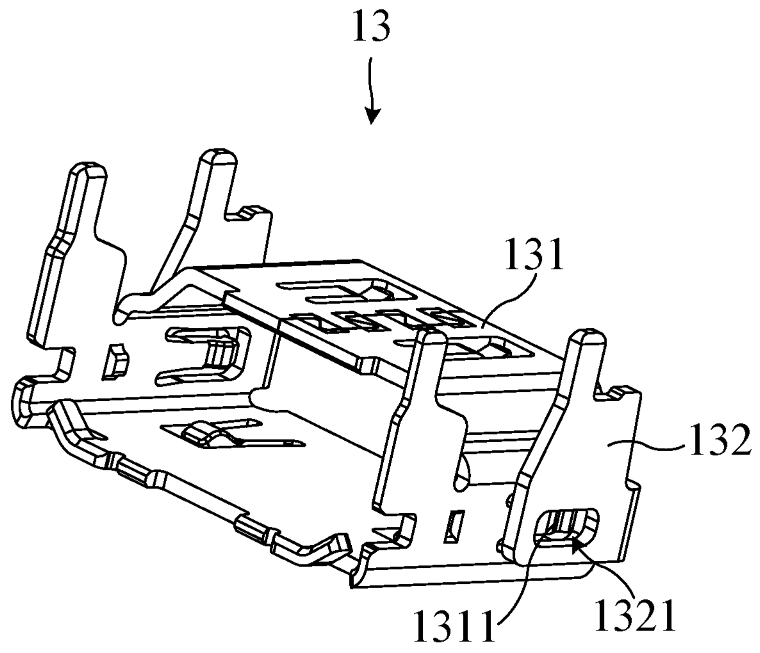
FIG. 6B is a structural schematic diagram illustrating the metal case in one perspective view of FIG. 1.

Please refer to FIG. 1, FIG. 2, FIG. 6A and FIG. 6B. FIG. 6A is a structural schematic diagram illustrating the unassembled metal case 13 of FIG. 1. FIG. 6B is a structural schematic diagram illustrating the metal case 13 in one perspective view of FIG. 1. As shown in FIG. 6A, in this embodiment, the metal case 13 includes a case body 131 and a protruding sheet 132 extended from the case body 131. The protruding sheet 132 has a hole 1321. In practice, the case body 131 of the metal case 13 can include two protruding sheets 132, and the protruding sheets 132 are disposed on the left side and right side of the case body 131 relatively. Furthermore, the protruding sheets 132 can be attached to the outer side of the case body 131 in an outward bending and backward bending manner respectively (as shown in FIG. 1 and FIG. 2), to increase the thickness of the side edge of the metal case 13. Therefore, when the plug inserts the multimedia socket connector 1 of the present invention, the metal case 13 is not easily deformed by lateral impact of the plug, thereby increasing the strength of the metal case 13. In addition, the protruding sheet 132 further includes a pin 1322 fixed and connected on the circuit board. That is to say, the case body of the metal case of the multimedia socket connector can totally cover the terminal set (as shown in FIG. 6B) without the need to break the hole to fold out the pin, thereby increasing the shielding efficiency.

In this embodiment, the case body 131 includes an elastic structure 1311, and the position of the elastic structure 1311 is corresponding to the position of the hole 1321 of the protruding sheet 132. In practice, the elastic structure 1311 can be shrapnel, and the elastic structure 1311 can be bent toward the containing space of the metal case 13. The case body 131 of the metal case 13 can include two elastic structures 1311, and the elastic structures 1311 are disposed on the left side and right side of the case body 131 relatively. When the two protruding sheet 132 of the metal case 13 are folded outward and attached to the left and right sides of the case body 131, the elastic structures 1311 of the case body 131 can correspond to the position of the holes 1321 of the protruding sheet 132. Therefore, when the plug inserts into the containing space of the metal case 13 of the multimedia socket connector, the plug squeeze and drive the elastic structures 1311 move toward the outer side of the metal case 13 to the hole 1321 of the protruding sheet 132, to avoid interference between the elastic structures 1311 and the protruding sheet 132. Furthermore, the elastic structure 1311 generates an elastic restoring force when the elastic structure 1311 is squeezed by the plug. The elastic structures 1311 on the left and right side will hold and clamp the plug according to the elastic restoring force, which will maintain the contact between the plug and the socket, thereby increasing the stability.

Figure 7:
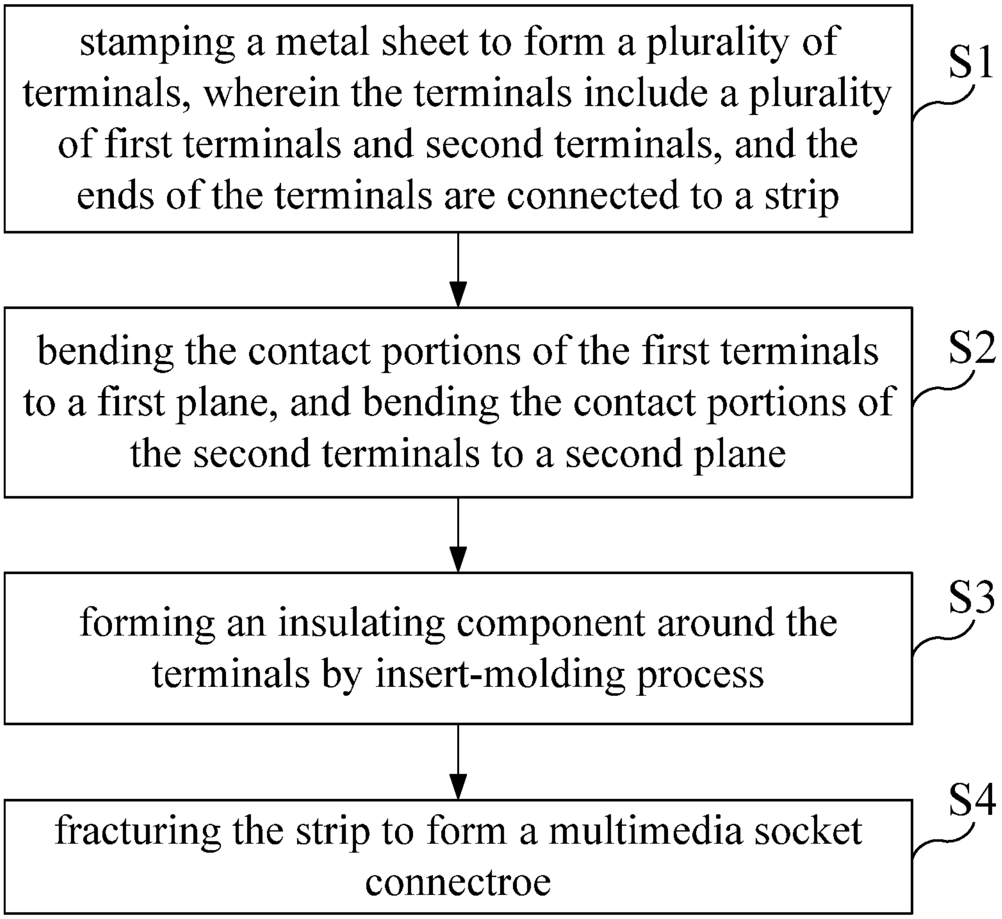
FIG. 7 is a flow chart of a manufacturing method of the multimedia socket connector according to an embodiment of the present invention.

Please refer to FIG. 7. FIG. 7 is a flow chart of a manufacturing method of the multimedia socket connector 1 according to an embodiment of the present invention. The steps in FIG. 7 can be illustrated with the structural diagrams in FIG. 2 to FIG. 5. As shown in FIG. 7, the manufacturing method of the multimedia socket connector 1 can include the following steps of: step S1: stamping a metal sheet to form a plurality of terminals 121, wherein the terminals 121 include a plurality of first terminals 121A and a plurality of second terminals 121B, and the ends of the terminals are connected to a strip 120; step S2: bending the contact portions 1212 of the first terminals 121A to a first plane 1120A, and bending the contact portions 1212 of the second terminals 121B to a second plane 1120B; step S3: forming an insulating component 11 around the terminals 121 by insert-molding; and step S4: fracturing the strip 120 to form a multimedia socket connector 1.

In summary, the multimedia socket connector of the present invention can be formed by the one-piece tear structure terminal. Therefore, the contact portions are staggered at the top and bottom and the main portions are horizontally arranged in the same plane with the same length, thereby reducing the cost and volume and improving the stability of signal transmission. Moreover, the multimedia socket connector of the present invention can effectively suppress interference from external components and prevent the signal fading and crosstalk of the signal terminals in the terminal set by setting the first ground terminal and the second ground terminal on the outermost side and wider than the other terminals, thereby improving the shielding efficiency. Furthermore, the recessed structure of the multimedia socket connector of the present invention can avoid the generation of burrs on the insulating component during fracturing the terminal set, thus enhancing the convenience, practicality and transmission characteristics of the socket connector. In addition, the multimedia socket connector of the present invention can increase the strength of the metal case through the protruding sheets of the metal case and make the case body completely cover the terminal set, thus enhancing the shielding efficiency. Moreover, the multimedia socket connector of the present invention can avoid structural interference and maintain contact between the plug and the socket by the elastic structures and the holes of the protruding sheets, thereby enhancing stability.

With the examples and explanations mentioned above, the features and spirits of the invention are hopefully well described. More importantly, the present invention is not limited to the embodiment described herein. Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A multimedia socket connector, comprising:

an insulating component, comprising an insulating main body and a tongue portion protruding from the insulating main body, the tongue portion comprising a plurality of first grooves, a plurality of second grooves and a plurality of fracture openings, the first grooves being configured on a first plane of the tongue portion, and the second grooves being configured on a second plane corresponding to the first plane, the fracture openings being configured on a third plane between the first plane and the second plane and corresponding to the insulating main body and communicated with the first grooves and the second grooves; and a terminal set, comprising a plurality of terminals, each of the terminals having a main portion, a contact portion extending from the main portion and a fracture portion, the terminals comprising a plurality of first terminals and a plurality of second terminals, the contact portions of the first terminals being configured in the first grooves respectively, the contact portions of the second terminals being configured in the second grooves respectively, and the main portions of the first terminals and the second terminals being horizontally arranged on the same plane, the fracture portion being located at the end of the contact portion and corresponding to the main portion, the fracture portions of the first terminals and the second terminals being configured in the fracture openings respectively.

2. The multimedia socket connector of claim 1, wherein the terminal set is formed in one piece, and the terminal set is formed by stamping and bending a single metal sheet.

3. The multimedia socket connector of claim 1, wherein the tongue portion comprises a plurality of protruding structures configured at the fracture openings respectively, and the fracture portion of the terminals has a fracture structure, the shape of the protruding structure is corresponding to the shape of the fracture structure.

4. The multimedia socket connector of claim 1, wherein the fracture openings are horizontally arranged on the same plane.

5. The multimedia socket connector of claim 1, wherein the tongue portion comprises a recessed structure configured on the third plane, and the fracture portions of the first terminals and the second terminals are aligned with the recessed structure.

6. The multimedia socket connector of claim 1, wherein the widths of outer terminals located on the outermost two sides of the terminal set are greater than the widths of the other terminals.

7. The multimedia socket connector of claim 1, further comprising a metal case sleeved on the outer side of the insulating component, the metal case comprising a case body and a protruding sheet extending from the case body, the protruding sheet comprising a hole, and the protruding sheet being attached to the outer side of the case body in a bent manner.

8. The multimedia socket connector of claim 7, wherein the case body comprises an elastic structure, and the position of the elastic structure is corresponding to the position of the hole, when a plug matching up with the multimedia socket connector inserts into the metal case, the elastic structure is squeezed by the plug to move into the hole.

9. The multimedia socket connector of claim 1, wherein the contact portions of the first terminal and the second terminal are arranged in stagger manner.

10. The multimedia socket connector of claim 1, wherein the lengths of the terminals of the terminal set are the same.

11. A manufacturing method of multimedia socket connector, comprising the following steps of:

stamping a metal sheet to form a plurality of terminals, wherein the terminals comprise a plurality of first terminals and a plurality of second terminals, and the ends of the terminals are connected to a strip, wherein each of the terminals has a main portion, a contact portion extending from the main portion and a fracture portion, the fracture portion is located at the end of the contact portion and corresponding to the main portion;

bending the contact portions of the first terminals to a first plane, and bending the contact portions of the second terminals to a second plane;

forming an insulating component around the terminals by insert-molding process, wherein the insulating component comprises an insulating main body and a tongue portion protruding from the insulating main body, the tongue portion comprising a plurality of first grooves configured on the first plane, a plurality of second grooves configured on the second plane and a plurality of fracture openings, the fracture openings are configured on a third plane between the first plane and the second plane and corresponding to the insulating main body and communicated with the first grooves and the second grooves, the fracture portions of the first terminals and the second terminals are configured in the fracture openings respectively; and fracturing the strip to form a multimedia socket connector.

* * * * *